United States Patent
Tanaka et al.

(10) Patent No.: US 10,883,427 B2
(45) Date of Patent: Jan. 5, 2021

(54) TURBINE ANALYSIS DEVICE, TURBINE ANALYSIS METHOD, AND PROGRAM

(71) Applicant: Mitsubishi Hitachi Power Systems, Ltd., Kanagawa (JP)

(72) Inventors: Toru Tanaka, Yokohama (JP); Akihisa Endo, Yokohama (JP); Yusuke Hazui, Tokyo (JP); Masumi Nomura, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 261 days.

(21) Appl. No.: 15/771,302

(22) PCT Filed: Oct. 25, 2016

(86) PCT No.: PCT/JP2016/081559
§ 371 (c)(1),
(2) Date: Apr. 26, 2018

(87) PCT Pub. No.: WO2017/073554
PCT Pub. Date: May 4, 2017

(65) Prior Publication Data
US 2018/0328290 A1    Nov. 15, 2018

(30) Foreign Application Priority Data
Oct. 28, 2015   (JP) .................................. 2015-211899

(51) Int. Cl.
*G01M 15/14* (2006.01)
*F02C 9/28* (2006.01)
(Continued)

(52) U.S. Cl.
CPC .............. *F02C 9/28* (2013.01); *F01D 21/003* (2013.01); *F01D 25/00* (2013.01); *F01D 25/005* (2013.01);
(Continued)

(58) Field of Classification Search
CPC .. G01M 15/14; F01D 21/003; F05D 2260/82; F05D 2260/821
(Continued)

(56) References Cited

U.S. PATENT DOCUMENTS 5,447,059 A * 9/1995 Miller ...................... G07C 3/00
                                                          73/112.03
6,343,251 B1 * 1/2002 Herron ...................... F02C 9/00
                                                          701/100
(Continued)

FOREIGN PATENT DOCUMENTS

| JP | 57-64141 | 4/1982 |
| JP | 60-182305 | 9/1985 |

(Continued)

OTHER PUBLICATIONS

International Search Report dated Jan. 24, 2017 in International (PCT) Application No. PCT/JP2016/081559, with English translation.
(Continued)

*Primary Examiner* — Eric S. McCall
(74) *Attorney, Agent, or Firm* — Wenderoth, Lind & Ponack, L.L.P.

(57) ABSTRACT

A turbine analysis device includes a state quantity acquiring unit configured to acquire a state quantity of a turbine, the state quantity including at least a temperature of the turbine. A load specifying unit is configured to calculate a history of a load of the turbine, based on the state quantity. A load and time calculating unit is configured to derive a relationship between the load of the turbine and an operable time when the turbine is operated at the load, based on a designed service life of the turbine and the history of the load that has been calculated by the load specifying unit.

9 Claims, 7 Drawing Sheets

(51) Int. Cl.
*G01M 99/00* (2011.01)
*F01D 25/00* (2006.01)
*F02C 7/00* (2006.01)
*F02C 3/00* (2006.01)
*F01D 21/00* (2006.01)
*F02C 7/36* (2006.01)

(52) U.S. Cl.
CPC .................. *F02C 3/00* (2013.01); *F02C 7/00* (2013.01); *F02C 7/36* (2013.01); *G01M 15/14* (2013.01); *G01M 99/00* (2013.01); *F05D 2220/32* (2013.01); *F05D 2260/80* (2013.01); *F05D 2260/81* (2013.01); *F05D 2260/82* (2013.01)

(58) Field of Classification Search
USPC ........................................................ 73/112.01
See application file for complete search history.

(56) References Cited

U.S. PATENT DOCUMENTS

| | | | |
|---|---|---|---|
| 2002/0120412 A1 | 8/2002 | Hayashi et al. | |
| 2005/0027586 A1* | 2/2005 | Bacon | G06Q 10/06 705/7.12 |
| 2005/0085989 A1* | 4/2005 | Martin | F01D 5/005 701/100 |
| 2006/0056959 A1* | 3/2006 | Sabol | F01D 17/02 415/118 |
| 2008/0054645 A1* | 3/2008 | Kulkarni | F01D 15/10 290/52 |
| 2009/0138211 A1* | 5/2009 | Gobrecht | F01K 23/101 702/34 |
| 2010/0050752 A1* | 3/2010 | Habets | F03D 7/028 73/112.01 |
| 2010/0236333 A1* | 9/2010 | Arai | G01N 3/60 73/788 |
| 2012/0084980 A1* | 4/2012 | Miglietti | C21D 9/50 29/889.1 |
| 2014/0088887 A1* | 3/2014 | Poon | G01M 13/00 702/34 |
| 2014/0163838 A1* | 6/2014 | Moeckly | F02C 9/00 701/100 |
| 2014/0244133 A1* | 8/2014 | De Prosperis | G05B 23/0208 701/100 |
| 2015/0184549 A1 | 7/2015 | Pamujula et al. | |
| 2018/0313720 A1* | 11/2018 | Tanaka | F01D 25/00 |
| 2018/0335018 A1* | 11/2018 | Cao | G05B 23/0286 |
| 2019/0345916 A1* | 11/2019 | Stephen | F03D 7/0224 |

FOREIGN PATENT DOCUMENTS

| | | |
|---|---|---|
| JP | 61-202136 | 9/1986 |
| JP | 2001-317369 | 11/2001 |
| JP | 2002-195056 | 7/2002 |
| JP | 2002-330541 | 11/2002 |
| JP | 2002-330542 | 11/2002 |
| JP | 2005-240776 | 9/2005 |
| JP | 2015-149885 | 8/2015 |

OTHER PUBLICATIONS

Written Opinion of the International Searching Authority dateed Jan. 24, 2017 in International (PCT) Application No. PCT/JP2016/081559, with English translation.

* cited by examiner

TURBINE ANALYSIS DEVICE, TURBINE ANALYSIS METHOD, AND PROGRAM

CROSS-REFERENCE TO RELATED APPLICATION

This application claims priority based on JP 2015-211899 filed in Japan on Oct. 28, 2015, of which the contents are incorporated herein by reference.

TECHNICAL FIELD

The present invention relates to a turbine analysis device, a turbine analysis method, and a program.

BACKGROUND ART

JP 2002-195056 A discloses a technology in which, in the rotation planning of a hot part of a gas turbine, a time of self-inspection is changed in a case where a remaining service life of the hot part is less than the next scheduled operation period to minimize the service life of the hot part remaining when the hot part is disposed of.

SUMMARY OF INVENTION

Technical Problem

However, a load specified in an operation plan for a plant and the actual load of the plant do not necessarily match. For example, operation at a partial load may be planned for in the operation plan for the plant, but, due to a sudden increase in power demand, the plant may be temporarily operated at a base load. In this case, with the technology disclosed in JP 2002-195056 A, the hot part may reach the end of its service life before the time of periodic inspection. Hence, there is a demand for a way of managing the service life of the turbine appropriately in accordance with the load.

An object of the present invention is to provide a turbine analysis device that appropriately manages the service life of a turbine in accordance with a load, a turbine analysis method, and a program.

Solution to Problems

According to a first aspect of the present invention, a turbine analysis devise includes: a state quantity acquiring unit configured to acquire a state quantity of a turbine, the state quantity including a temperature of the turbine; a load specifying unit configured to specify a history of a load of the turbine, based on the state quantity; and a load and time calculating unit configured to calculate a relationship between the load of the turbine and an operable time in a case where the turbine operates at the load, based on a designed service life of the turbine and the history of the load that has been specified by the load specifying unit.

According to a second aspect of the present invention, in the turbine analysis device according to the first aspect, the load specifying unit is configured to specify a temperature history variable indicating a history of a temperature to which the turbine is subject, based on the state quantity, and the load and time calculating unit is configured to calculate the relationship between the load of the turbine and the operable time in the case where the turbine operates at the load, based on the designed service life of the turbine and the temperature history variable.

According to a third aspect of the present invention, the turbine analysis device according to the first or second aspect further includes a time specifying unit configured to specify a time over which the turbine is to continue an operation, and the load and time calculating unit is configured to calculate a load that enables the turbine to continue the operation over the time specified by the time specifying unit.

According to a fourth aspect of the present invention, the turbine analysis device according to the third aspect further includes an operability determining unit configured to determine whether the turbine is capable of continuing the operation until a predetermined inspection time in a case where the turbine operates at a predetermined load. The time specifying unit is configured to specify a time from a present time to the inspection time, as the time over which the turbine is to continue the operation, and in a case where the operability determining unit determines that the turbine is not capable of continuing the operation, the load and time calculating unit is configured to calculate the load that enables the turbine to continue the operation over the time that has been specified by the time specifying unit.

According to a fifth aspect of the present invention, the turbine analysis device according to the third or fourth aspect further includes: a power generation amount predicting unit configured to predict an amount of power to be generated by a plurality of turbines; and an operation plan generating unit configured to generate an operation plan for the plurality of turbines, based on the load that has been calculated by the load and time calculating unit and the amount of power that has been predicted by the power generation amount predicting unit.

According to a sixth aspect of the present invention, the turbine analysis device according to the first or second aspect further includes a load input unit configured to receive an input of the load at which the turbine is to operate, and the load and time calculating unit is configured to calculate the operable time of the turbine according to the input load.

According to a seventh aspect of the present invention, a turbine analysis method includes the steps of: acquiring a state quantity of a turbine, the state quantity including a temperature of the turbine; specifying a history of a load of the turbine, based on the state quantity; and calculating a relationship between the load of the turbine and an operable time in a case where the turbine operates at the load, based on a designed service life of the turbine and the history of the load that has been specified.

According to an eighth aspect of the present invention, a program causes a computer to function as: a state quantity acquiring unit configured to acquire a state quantity of a turbine, the state quantity including a temperature of the turbine; a load specifying unit configured to specify a history of a load of the turbine, based on the state quantity; and a load and time calculating unit configured to calculate a relationship between the load of the turbine and an operable time in a case where the turbine operates at the load, based on a designed service life of the turbine and the history of the load that has been specified by the load specifying unit.

Advantageous Effects of Invention

According to at least one of the above-described aspects, a turbine analysis device calculates a relationship between a load and an operable time of a turbine, based on a load history of the turbine. In this way, the turbine analysis device can appropriately manage the service life of the turbine in accordance with the load.

DESCRIPTION OF EMBODIMENTS

First Embodiment

A first embodiment will be described below in detail with reference to the appended drawings.

Figure 1:
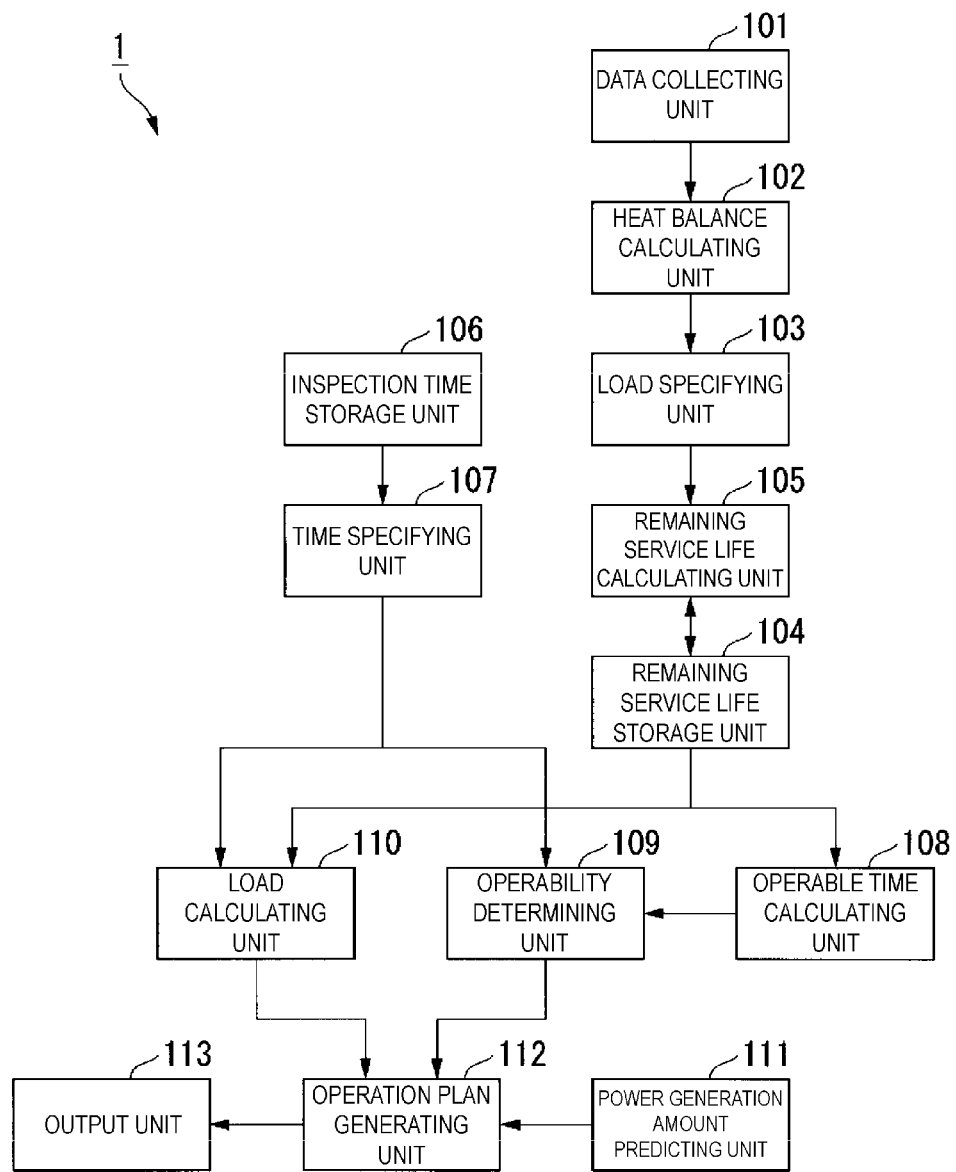
FIG. 1 is a schematic block diagram illustrating a configuration of a planning device according to a first embodiment.

FIG. 1 is a schematic block diagram illustrating a configuration of a planning device according to the first embodiment.

A turbine analysis device 1 according to the first embodiment generates an operation plan for a plurality of turbines.

The operation plan for the turbines according to the first embodiment is information indicating a load pertaining to an operation of each of the turbines.

The turbine analysis device 1 according to the first embodiment includes a data collecting unit 101, a heat balance calculating unit 102, a load specifying unit 103, a remaining service life storage unit 104, a remaining service life calculating unit 105, an inspection time storage unit 106, a time specifying unit 107, an operable time calculating unit 108, an operability determining unit 109, a load calculating unit 110, a power generation amount predicting unit 111, an operation plan generating unit 112, and an output unit 113.

The data collecting unit 101 collects operation data of a turbine in real time from a power generation plant owned by a customer. More specifically, the data collecting unit 101 collects the operation data from a sensor provided at a turbine for each predetermined collection period (5 minutes, for example). The collection period is a period short enough not to undermine the immediacy of the monitoring. Examples of the operation data include a flow rate, a pressure, a temperature, vibrations, and other state quantities. The data collecting unit 101 is an example of a state quantity acquiring unit that acquires a state quantity of the turbine.

The heat balance calculating unit 102 calculates a heat balance of the turbine, based on the operation data collected by the data collecting unit 101. The heat balance includes the temperature, the pressure, an enthalpy, the flow rate, and other state quantities that are associated with each component mounted in the turbine. The heat balance calculating unit 102 calculates the heat balance by performing a simulation based on the operation data. Examples of the simulation methods for calculating the heat balance include Finite Element Method (FEM) and Computational Fluid Dynamics (CFD). The heat balance calculating unit 102 is an example of the state quantity acquiring unit that acquires the state quantity of the turbine.

The load specifying unit 103 calculates a. Larson-Miller Parameter (LMP) value $L_c$, which indicates a deterioration quantity of each of the components in the last collection period, based on the heat balance that has been calculated by the heat balance calculating unit 102. The LMP value $L_c$ is a parameter to be calculated by the following Equation (1).

[Equation 1]

$$L_c = T_c(\log t_c + C) \quad (1)$$

$T_c$ indicates a thermodynamic temperature of a component. A thermodynamic temperature is equal to a value obtained by adding 273.15 to a Celsius temperature. The temperature of the component is specified by the heat balance that has been calculated by the heat balance calculating unit 102. $t_c$ indicates an operating time of the turbine at the temperature $T_c$. In other words, the time $t_c$ is equal to the collection period of the data collecting unit 101. C is a fixed value to be determined by a material of the component. For example, when the material of the component is low-carbon steel or chrome-molybdenum steel, the fixed value C may be 20. Further, when the material of the component is stainless steel, the fixed value C may be 15.

In this way, the LMP value is a parameter that is specified by the temperature of the component and the operating time.

In other words, the LMP value is an example of a temperature history variable pertaining to a history of the temperature to which the component is subject. The LMP value can indicate a state relating to a degree of creep deformation. Further, the LMP value is an example of a history of the load to which the component is subject.

The remaining service life storage unit 104 stores a remaining service life of each of the components of the turbine. The remaining service life of the component stored in the remaining service life storage unit 104 is indicated by a time remaining until the component reaches the end of its service life when the turbine is operated at a rated temperature. The remaining service life storage unit 104 stores a designed service life of the component as an initial value for the remaining service life of the component.

The remaining service life calculating unit 105 calculates the remaining service life of each of the components of the turbine, based on the LMP value that has been calculated by the load specifying unit 103, the remaining service life of the component stored in the remaining service life storage unit 104, and the rated temperature.

More specifically, the remaining service life calculating unit 105 calculates a consumed service life $t_s$ converted into an operation at a rated temperature, by substituting the LMP value $L_0$ calculated by the load specifying unit 103 and a rated temperature $T_s$ in the following Equation (2). Then, the remaining service life calculating unit 105 calculates the remaining service life by subtracting the calculated consumed service life from the remaining service life stored in the remaining service life storage unit 104.

[Equation 2]

$$t_s = 10^{\frac{L_c}{T_s} - C} \qquad (2)$$

The inspection time storage unit 106 stores an inspection time of the turbine.

The time specifying unit 107 specifies a time from a present time to the inspection time, based on the inspection time stored in the inspection time storage unit. The time from the present time to the inspection time is an example of a time over which the operation of the turbine is to continue.

The operable time calculating unit 108 calculates an operable time of the turbine in an operation according to the current operation plan, based on the remaining service life stored in the remaining service life storage unit 104. The operable time calculating unit 108 is an example of a load and time calculating unit that calculates a relationship between a load of the turbine and an operable time when the turbine is operated at such a load. More specifically, the operable time calculating unit 108 calculates an LMP value $L_l$ of each of the components by substituting a remaining service life $t_l$ stored in the remaining service life storage unit 104 and the rated temperature $T_s$ in the following Equation (3).

[Equation 3]

$$L_l = T_s(\log t_l + C) \qquad (3)$$

Next, the operable time calculating unit 108 calculates an operable time $t_p$ by substituting the calculated LMP value $L_l$ and a temperature $T_p$ corresponding to the load indicated by the operation plan in the following Equation (4).

[Equation 4]

$$t_p = 10^{\frac{L_l}{T_p} - C} \qquad (4)$$

On the basis of the operable time that has been calculated by the operable time calculating unit 108 and the time that has been specified by the time specifying unit 107, the operability determining unit 109 determines whether the turbine can continue the operation at the load indicated by the operation plan over the time specified by the time specifying unit 107.

The load calculating unit 110 calculates a load that enables the operation of the turbine over the time that has been specified by the time specifying unit 107, based on the remaining service life stored in the remaining service life storage unit 104. The load calculating unit 110 is an example of the load and time calculating unit that calculates the relationship between the load of the turbine and the operable time when the turbine is operated at that load. More specifically, the load calculating unit 110 calculates a temperature $T_i$ by substituting the LMP value $L_l$ calculated using the above-described Equation (3) and a time $t_i$ specified by the time specifying unit 107 in the following Equation (5). Next, the load calculating unit 110 specifies an operation load of the turbine, based on the calculated temperature $T_i$.

[Equation 5]

$$T_i = \frac{L_l}{\log t_i + C} \qquad (5)$$

The power generation amount predicting unit 111 obtains market power demand information via a network, and predicts an amount of power to be generated by the power generation plants under management as a whole.

The operation plan generating unit 112 generates the operation plan indicating the load of the turbine, based on the load that has been calculated by the load calculating unit 110 and the result of the prediction that has been made by the power generation amount predicting unit 111. More specifically, the operation plan generating unit 112 determines the operation plan to be used until the inspection time of the turbine, which has been determined by the operability determining unit 109 to be unable to continue operating at the load indicated by the current operation plan, for an operation at the load that has been calculated by the load calculating unit 110. Then, the operation plan generating unit 112 generates the operation plan of the turbine, which has been determined by the operability determining unit 109 to be able to continue operating at the load indicated by the current operation plan, to satisfy the power generation amount that has been predicted by the power generation amount predicting unit 111.

The output unit 113 outputs the operation plan that has been generated by the operation plan generating unit 112. Examples of output formats of the operation plan include displaying on a display, recording on a storage medium, and printing on a sheet.

Next, operations of the turbine analysis device 1 according to the present embodiment will be described.

Figure 2:
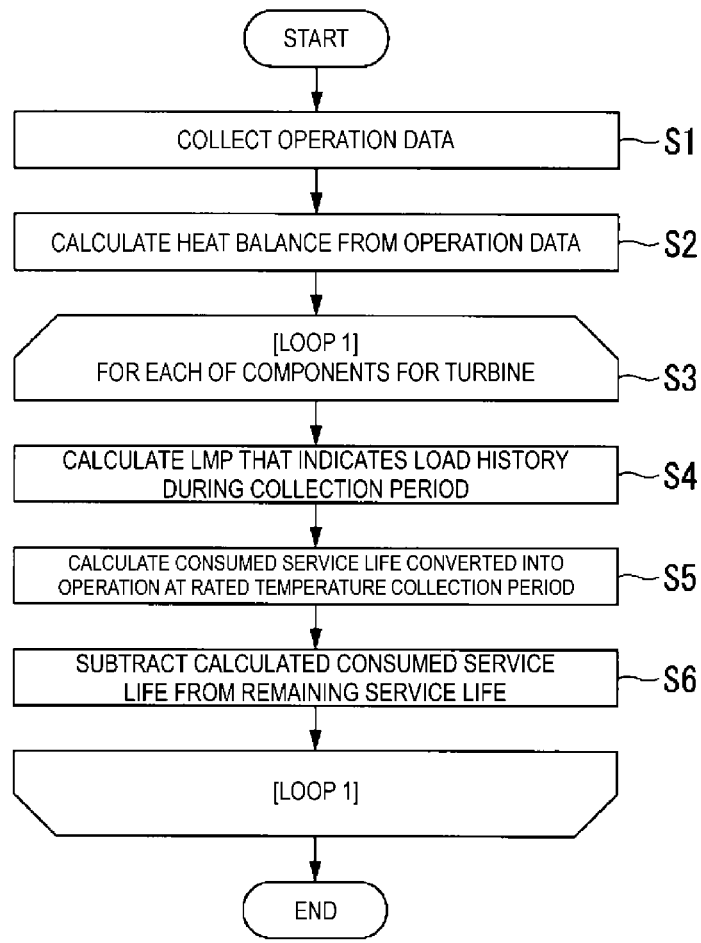
FIG. 2 is a flowchart illustrating operations, during each of collection periods, of a turbine analysis device according to the first embodiment.

FIG. 2 is a flowchart illustrating operations, during each collection period, of the turbine analysis device according to the first embodiment.

The turbine analysis device 1 performs the following processing during each of the collection periods.

First, the data collecting unit 101 collects operation data of the turbine from a sensor provided at the turbine (step S1). Next, the heat balance calculating unit 102 calculates a heat balance of the turbine using the collected operation data as an input (step S2).

Next, the turbine analysis device 1 selects, one by one, components that are assembled in the turbine, and for each of the selected components, performs the following processing from step S4 to step S6 (step S3).

First, the load specifying unit 103 calculates the LMP value indicating a history of the load for the selected component, using the heat balance that has been calculated by the heat balance calculating unit 102 (step S4). Next, the remaining service life calculating unit 105 calculates the consumed service life converted into the operation at the rated temperature, based on the LMP value calculated by the load specifying unit 103 (step S5). Next, the remaining service life calculating unit 105 subtracts the calculated consumed service life from the remaining service life stored in the remaining service life storage unit 104 (step S6). In this way, the remaining service life calculating unit 105 updates the remaining service life stored in the remaining service life storage unit 104.

By performing the above-described processing from step S1 to step S6 in each of the collection periods, the turbine analysis device 1 can maintain the remaining service life of each of the components stored in the remaining service life storage unit 104, in an updated state.

Next, operation plan reviewing processing performed by the turbine analysis device 1 according to the present embodiment will be described. The turbine analysis device 1 reviews the operation plan for each of the power generation plants at a time specified by a user, or on a regular basis. In other words, when a component of the turbine is predicted to reach the end of its service life before the inspection time as a result of the turbine being operated in accordance with the currently used operation plan, the turbine analysis device 1 changes the operation plan such that none of the components of the turbine will reach the ends of their service lives before the inspection time.

Figure 3:
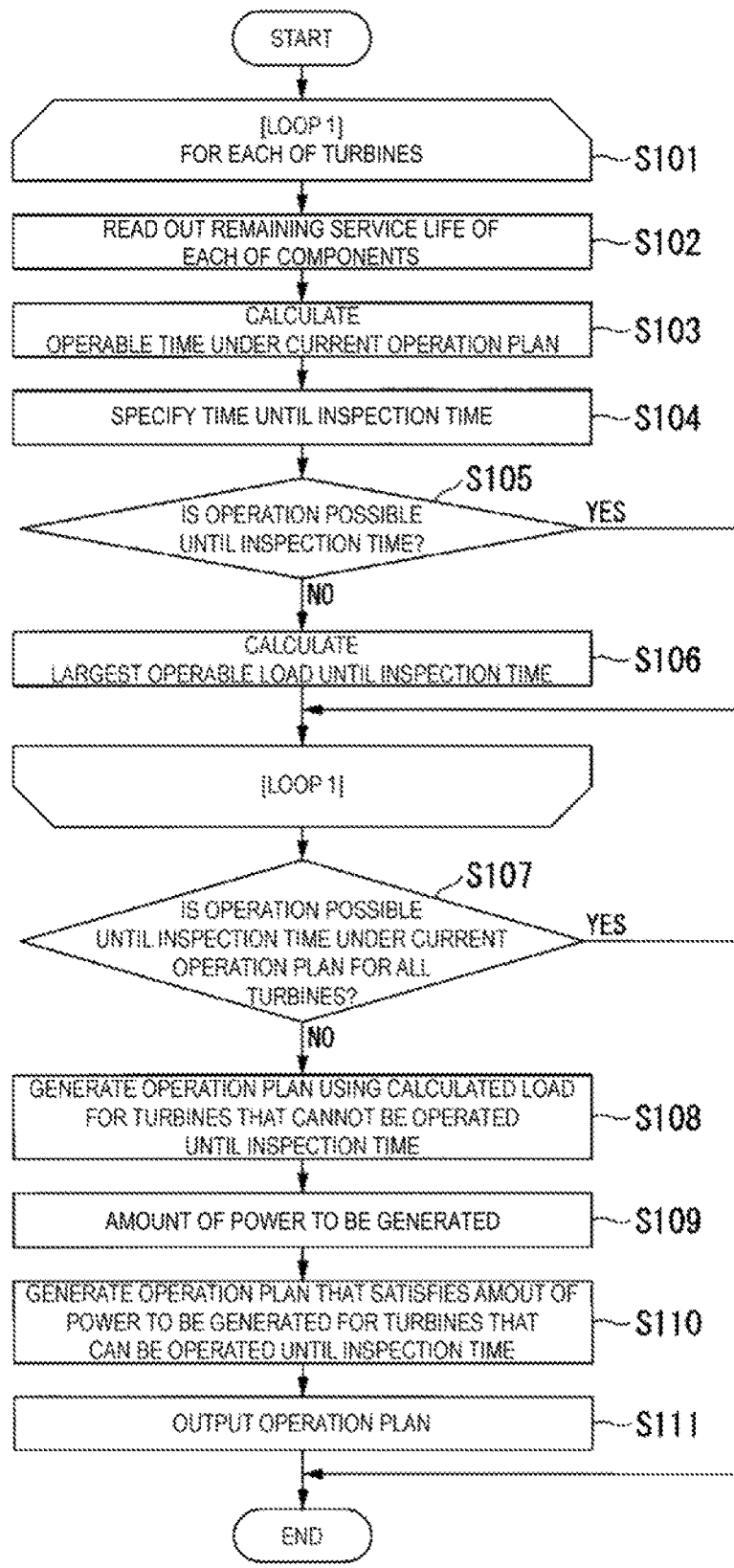
FIG. 3 is a flowchart illustrating operation plan generation processing performed by the turbine analysis device according to the first embodiment.

FIG. 3 is a flowchart illustrating operation plan generation processing performed by the turbine analysis device according to the first embodiment.

When the turbine analysis device 1 starts the operation plan reviewing processing, the turbine analysis device 1 selects, one by one, each of the turbines whose operation plan is to be reviewed, and for each of the selected turbines, performs the following processing from step S102 to step S106 (step S101).

First, the operable time calculating unit 108 reads out, from the remaining service life storage unit 104, the remaining service life that is associated with each of the components assembled in the selected turbine (step S102). Next, the operable time calculating unit 108 calculates, for each of the components, the operable time under the operation according to the current operation plan (step S103). Next, the time specifying unit 107 reads out the inspection time that is associated with the selected turbine from the inspection time storage unit 106, and specifies the time from the present time to the inspection time (step S104). Next, the operability determining unit 109 compares the shortest operable time of each of the components, which has been calculated by the operable time calculating unit 108, with the time specified by the time specifying unit 107, and determines whether the operation according to the current operation plan can continue until the next inspection time (step S105).

When the operability determining unit 109 determines, for the selected turbine, that the operation according to the current operation plan can continue until the next inspection time (YES at step S105), the turbine analysis device 1 returns to step S101, and selects the next turbine. On the other hand, when the operability determining unit 109 determines, for the selected turbine, that the operation according to the current operation plan cannot continue until the next inspection time (NO at step S105), the load calculating unit 110 calculates, for each of the components, the largest load that enables the selected turbine to be operated over the time specified by the time specifying unit 107 (step S106).

When the turbine analysis device 1 performs the processing from step S102 to step S106 for all of the turbines, the operation plan generating unit 112 determines, for all of the turbines, whether the operation according to the current operation plan can continue until the next inspection time (step S107). In other words, the operation plan generating unit 112 determines whether the results of the determination made by the operability determining unit 109 at step S105 are all YES. When the operation according to the current operation plan can continue until the next inspection time with respect to all of the turbines (YES at step S107), there is no need to change the operation plan. Thus, the turbine analysis device 1 ends the processing without generating a new operation plan.

On the other hand, when there is a turbine that cannot be operated until the next inspection time in accordance with the current operation plan (NO at step S107), the operation plan generating unit 112 generates, for the turbine that cannot be operated in accordance with the operation plan, an operation plan that causes the turbine to be operated at the load calculated by the load calculating unit 110 until the inspection time (step S108). The power generation amount predicting unit 111 obtains the market power demand information via the network, and predicts the amount of power to be generated by the power generation plants under management (step S109). Next, the operation plan generating unit 112 generates the operation plan of the turbines to be inspected, so as to satisfy the predicted amount of power (step S110). More specifically, the operation plan generating unit 112 calculates an allocation of the power generation amount for each of the turbines determined at step S105 to be able to operate in accordance with the operation plan, so as to satisfy the power generation amount predicted by the power generation amount predicting unit 111.

Then, the output unit 113 outputs the operation plan generated by the operation plan generating unit 112 (step S111).

In this way, the turbine analysis device 1 according to the present embodiment calculates the relationship between the load of the turbine and the operable time when the turbine is operated at that load, based on the load history of the turbine and the designed service life of the turbine. More specifically, the operable time calculating unit 108 calculates the operable time of the turbine, based on the load indicated by the current operation plan. Further, the load calculating unit 110 calculates the load that enables the turbine to continue the operation over the time specified by the time specifying unit 107.

In this way, the turbine analysis device 1 can appropriately manage the service life of the turbine in accordance with the load.

Further, when the turbine cannot continue the operation until the inspection time at the load indicated by the current operation plan, the turbine analysis device 1 according to the present embodiment calculates a load that enables the turbine to continue the operation over a period up to the inspection time. In this way, in a case where a hot part may reach the end of its service life before the inspection time, the turbine analysis device 1 can change the operation plan to prevent the part from reaching the end of its service life before the inspection time.

Further, the turbine analysis device 1 according to the present embodiment generates the operation plan for the plurality of turbines, based on the predicted amount of power to be generated by the plurality of turbines. In this way, even when the operation plan for some of the turbines is changed to prevent the turbines from reaching the ends of their service lives before the inspection time, the turbine analysis device 1 can change the operation plan for the remaining turbines such that the overall power generation amount satisfies the predicted amount of power.

Second Embodiment

A second embodiment will be described below in detail with reference to the appended drawings.

In the first embodiment, the turbine analysis device 1 determines the operation load for each of the turbines. In contrast, in the second embodiment, an owner of the turbines sets an operation load for each of the turbines. The turbine analysis device 1 according to the second embodiment calculates the operable time of each of the turbines at the operation load input by the owner, and presents the operable time.

Figure 4:
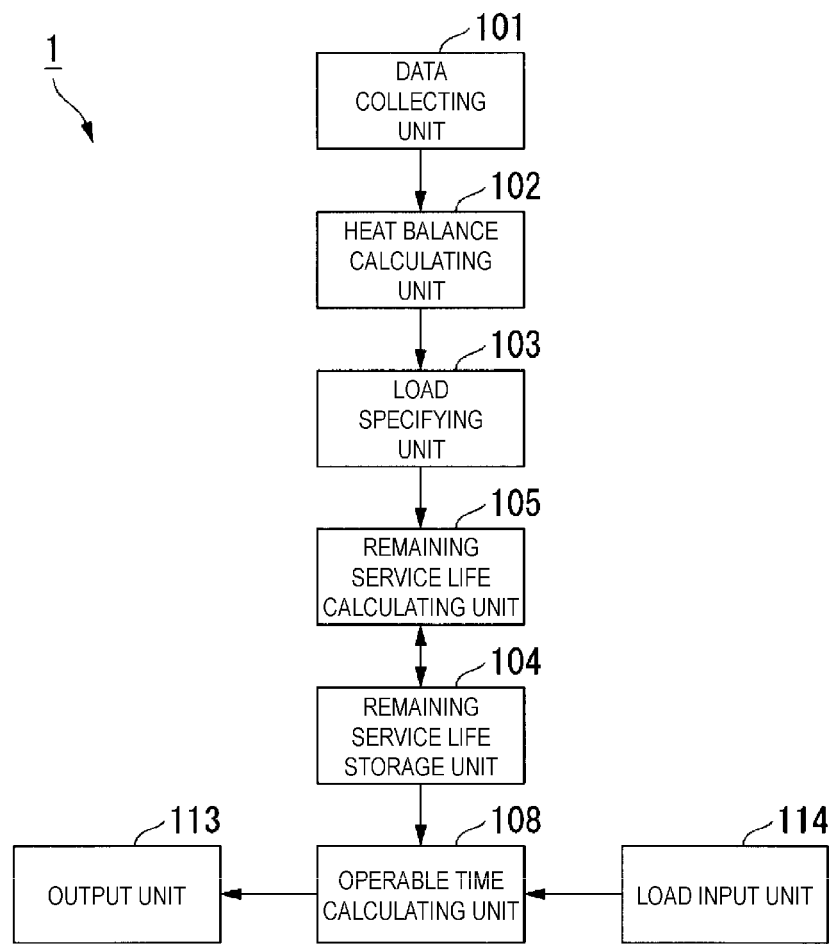
FIG. 4 is a schematic block diagram illustrating a configuration of a turbine analysis device according to a second embodiment.

FIG. 4 is a schematic block diagram illustrating a configuration of the turbine analysis device according to the second embodiment.

With respect to the configuration of the first embodiment, the turbine analysis device 1 according to the second embodiment does not include the inspection time storage unit 106, the time specifying unit 107, the operability determining unit 109, the load calculating unit 110, the power generation amount predicting unit 111, or the operation plan generating unit 112. On the other hand, the turbine analysis device 1 according to the second embodiment further includes a load input unit 114, in addition to the configuration of the first embodiment.

The load input unit 114 receives an input of the operation load for a turbine from the owner.

On the basis of the remaining service life stored in the remaining service life storage unit 104, the operable time calculating unit 108 calculates the operable time for the turbine to operate at the operation load input into the load input unit 114.

The output unit 113 outputs the operable time that has been calculated by the operable time calculating unit 108.

Figure 5:
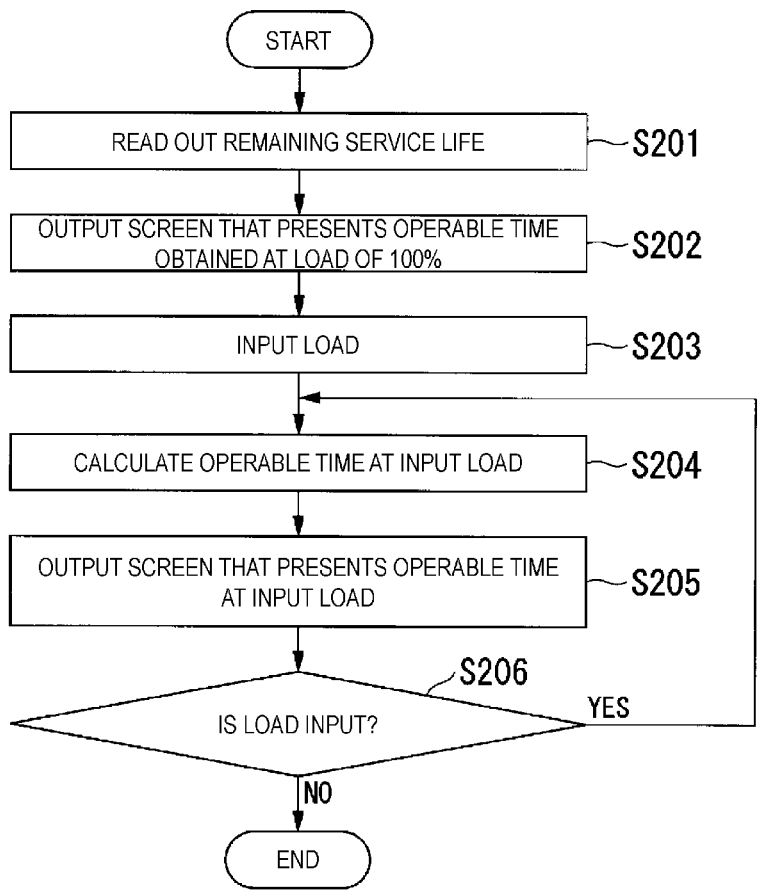
FIG. 5 is a flowchart illustrating operable time presentation processing performed by the turbine analysis device according to the second embodiment.

FIG. 5 is a flowchart illustrating operable time presentation processing performed by the turbine analysis device according to the second embodiment.

Figure 6:
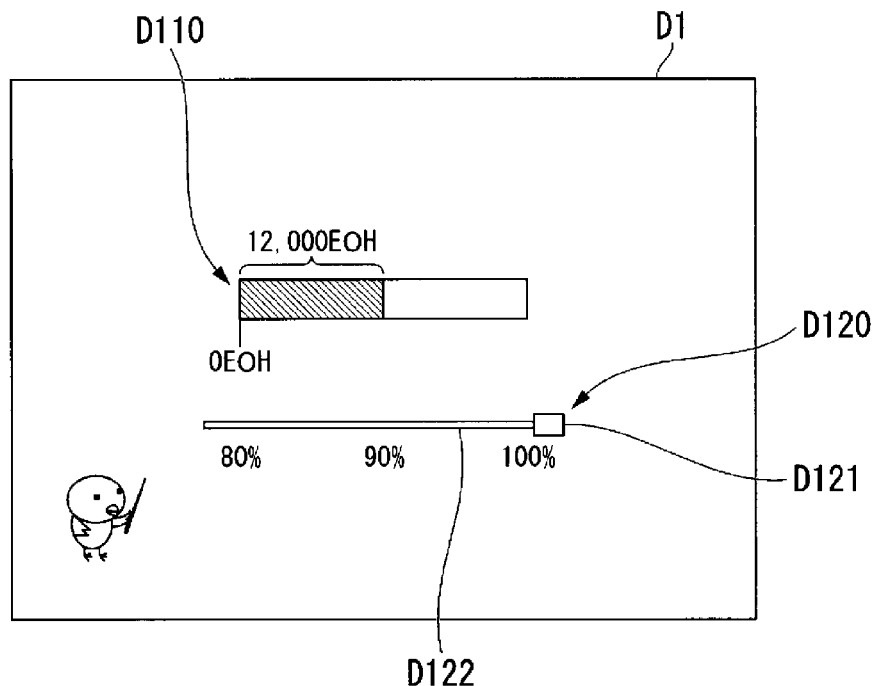
FIG. 6 is a diagram illustrating a first example of a presentation screen of an operable time to be output by the turbine analysis device according to the second embodiment.

FIG. 6 is a diagram illustrating a first example of a presentation screen of the operable time to be output by the turbine analysis device according to the second embodiment.

When the turbine analysis device 1 receives, from the owner of the turbine, a request to present the operable time, the turbine analysis device 1 starts the operable time presentation processing. The operable time calculating unit 108 reads out, from the remaining service life storage unit 104, the remaining service life of the turbine for which the operable time is to be presented (step S201).

Next, as illustrated in FIG. 6, the output unit 113 outputs, as an initial screen, a presentation screen D1 that presents the operable time when the load is 100%, based on the remaining service life read out by the operable time calculating unit 108 (step S202). The presentation screen D1 is a screen that includes an operable time bar D110 and a load bar D120. The operable time bar D110 is an indicator that indicates the operable time by its length. The longer the operable time of the turbine is, the longer the length of the operable time bar D110 becomes. On the other hand, the shorter the operable time of the turbine is, the shorter the length of the operable time bar D110 becomes. The load bar D120 is a slider that receives the input of the operation load for the turbine. The load bar D120 includes a tab D121 and a track D122. By dragging and dropping the tab D121 along the track D122, a desired load can be selected. The track D122 indicates a movable range of the tab D121.

The load input unit 114 receives the input of the load by receiving an operation of the tab D121 of the load bar D120 from the owner (step S203). Next, on the basis of the remaining service life read out at step S201, the operable time calculating unit 108 calculates the operable time when the turbine is operated at the load that has been input into the load input unit 114 (step S204).

More specifically, an operable time $t_p$ is calculated by calculating the LMP value $L_l$ by substituting the remaining service life $t_l$ read out at step S201 and the rated temperature $T_s$ in the above-described Equation (3), and by substituting the calculated LMP value $L_l$ and the temperature $T_p$ corresponding to the load that has been input into the load input unit 114 in the above-described Equation (4).

Figure 7:
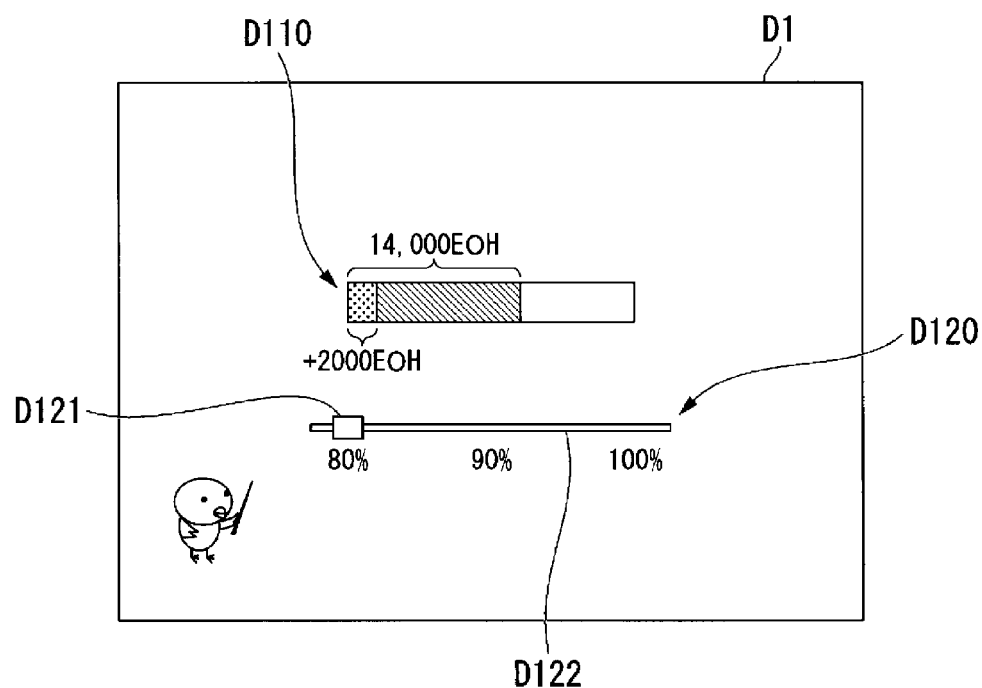
FIG. 7 is a diagram illustrating a second example of the presentation screen of the operable time to be output by the turbine analysis device according to the second embodiment.

FIG. 7 is a diagram illustrating a second example of the presentation screen of the operable time to be output by the turbine analysis device according to the second embodiment.

Next, as illustrated in FIG. 7, the output unit 113 outputs, onto a display, the presentation screen D1 that presents the operable time that has been calculated by the operable time calculating unit 108 (step S205). As illustrated in FIG. 7, when the operation load less than 100% is input into the load input unit 114, the length of the operable time bar D110 becomes longer than the length presented at step S202. In this situation, the operable time bar D110 displays an increased portion that has increased from the operable time presented at step S202, using a different format (for example, a color, a pattern, or the like). For example, in a case where the operable time is 12,000 EOH (Equivalent Operating Hours) at the load of 100% as illustrated in FIG. 6 and the operable time is 14,000 EOH at the load of 80% as illustrated in FIG. 7, an increased portion, which is equivalent to 2,000 EOH, of the operable time bar D110 is displayed in a different format. In this way, the owner learns an increased amount of the operable time as a result of changing the load.

Next, the load input unit 114 determines whether there is any additional input of the operation load from the user (step S206). When the operation load is input into the load input unit 114 (step S206: YES), the turbine analysis device 1 returns the processing to step S204, and recalculates the operable time. On the other hand, when the operation load is not input into the load input unit 114 (step S206: NO), the turbine analysis device 1 ends the processing.

In this way, the turbine analysis device 1 according to the present embodiment receives an input of a load to a turbine, and calculates the operable time when the turbine operates at such a load. Accordingly, the turbine analysis device 1 presents an operable time to the owner, in a case where the load of the turbine is changed.

Embodiments have been described above in detail with reference to the appended drawings. However, a specific configuration is not limited to those described above, and various design changes and the like may be made.

For example, in the above-described embodiments, the turbine analysis device 1 determines whether a component reaches the end of its service life as a result of creep deformation by using an LMP, which is a temperature history variable that indicates a history of temperature to which a turbine is subject, but the above-described embodiments are not limited to this example. For example, in another embodiment, another temperature history variable may be used to determine whether a component reaches the end of its service life. For example, the turbine analysis device 1 according to another embodiment may determine whether a component reaches the end of its service life as a result of low cycle fatigue by using a temperature history variable that indicates a relationship between the temperature and the number of cycles. Further, the turbine analysis device 1 according to yet another embodiment may determine whether a part reaches the end of its service life, based on a plurality of deterioration causes, such as creep deformation and low cycle fatigue, while using a plurality of temperature history variables.

Further, the turbine analysis device 1 according to further another embodiment may calculate a consumed service life using a load history that is specified by an inlet temperature (T1T), a load percentage, a power generating capacity, or another state quantity of the turbine.

Further, in the above-described embodiments, the turbine analysis device 1 calculates an operable time of the entire turbine, based on the remaining service life of each of the components that configure the turbine, but the above-described embodiments are not limited to this example. For example, the turbine analysis device 1 according to another embodiment may directly calculate the remaining service life of the entire turbine, based on the designed service life of the entire turbine without calculating the remaining service life of each of the components.

Further, in the above-described embodiments, the load specifying unit 103 performs the calculation based on the heat balance that has been calculated by the heat balance calculating unit 102, but the above-described embodiments are not limited to this example. For example, in another embodiment, the load specifying unit 103 may perform the calculation, based on the operation data that have been collected by the data collecting unit 101. In this case, the turbine analysis device 1 may not necessarily include the heat balance calculating unit 102.

Figure 8:
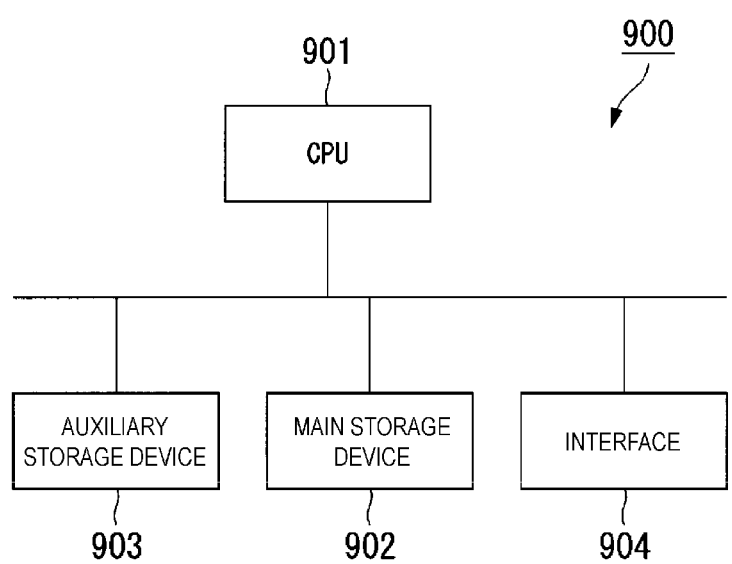
FIG. 8 is a schematic block diagram illustrating a configuration of a computer according to at least one embodiment.

FIG. 8 is a schematic block diagram illustrating a configuration of a computer according to at least one embodiment.

A computer 900 includes a CPU 901, a main storage device 902, an auxiliary storage device 903, and an interface 904.

The above-described turbine analysis device 1 is implemented in the computer 900. Then, the operation of each of the above-described processing units is stored in the auxiliary storage device 903 in the form of a program. The CPU 901 reads out the program from the auxiliary storage device 903, loads the program onto the main storage device 902, and performs the above-described processing in accordance with the program. Further, in accordance with the program, the CPU 901 secures storage regions corresponding to the above-described storage units in the main storage device 902.

Note that in at least one of embodiments, the auxiliary storage device 903 is an example of a non-transitory tangible medium. Other examples of the non-transitory tangible media include a magnetic disk, a magneto-optical disk, a CD-ROM, a DVD-ROM, a semiconductor memory, and the like that are connected via the interface 904. Further, when the program is distributed to the computer 900 via a communication line, the computer 900 that has received the distributed program may load the program into the main storage device 902 and perform the above-described processing.

Also, the above-described program may enable some of the above-described functions.

In addition, the above-described program may enable the above-described functions in combination with another program already stored in the auxiliary storage device 903. In other words, the above-described program may be a so-called difference file (differential program).

INDUSTRIAL APPLICABILITY

A turbine analysis device calculates a relationship between a load and an operable time of a turbine, based on a load history of the turbine. In this way, the turbine analysis device can appropriately manage the service life of the turbine in accordance with the load.

REFERENCE SIGNS LIST

1 Turbine analysis device
101 Data collecting unit
102 Heat balance calculating unit
103 Load specifying unit
104 Remaining service life storage unit
105 Remaining service life calculating unit
106 Inspection time storage unit
107 Time specifying unit
108 Operable time calculating unit
109 Operability determining unit
110 Load calculating unit
111 Power generation amount predicting unit
112 Operation plan generating unit
113 Output unit
114 Load input unit
900 Computer
901 CPU
902 Main storage device
903 Auxiliary storage device
904 Interface

The invention claimed is:

1. A turbine analysis device comprising:
   a state quantity acquiring unit configured to acquire a state quantity of a turbine, the state quantity including at least a temperature of the turbine;
   a load specifying unit configured to calculate a first Larson-Miller Parameter (LMP) value indicating a history of a load of the turbine, based on the state quantity;
   a remaining service life calculating unit configured to calculate a consumed service life based on the first LMP value calculated by the load specifying unit and the temperature of the turbine, and calculate a remaining service life of the turbine by subtracting the consumed service life from a designed service life of the turbine; and
   a load and time calculating unit configured to derive a relationship between the load of the turbine and an operable time in a case where the turbine operates at the load, based on a second LMP value calculated from the remaining service life and a rated temperature.

2. The turbine analysis device according to claim 1, wherein the first LMP value is calculated by the temperature of the turbine and an operating time of the turbine, or calculated by a relationship between the temperature of the turbine and a number of cycles.

3. The turbine analysis device according to claim 1, further comprising a time specifying unit configured to calculate a time over which the turbine is to continue an operation,
   wherein the load and time calculating unit is configured to calculate a load that enables the turbine to continue the operation over the time that has been calculated by the time specifying unit.

4. The turbine analysis device according to claim 3, further comprising an operability determining unit configured to determine whether the turbine is capable of continuing the operation until a predetermined inspection time in a case where the turbine operates at a predetermined load, wherein:
the time specifying unit is configured to calculate a time from a present time to the inspection time, as the time over which the turbine is to continue the operation; and
in a case where the operability determining unit determines that the turbine is not capable of continuing the operation, the load and time calculating unit is configured to calculate the load that enables the turbine to continue the operation over the time that has been calculated by the time specifying unit.

5. The turbine analysis device according to claim 3, further comprising:
a power generation amount predicting unit configured to predict an amount of power to be generated by a plurality of turbines including the turbine; and
an operation plan generating unit configured to generate an operation plan for the plurality of turbines, based on the load that has been calculated by the load and time calculating unit and the amount of power that has been predicted by the power generation amount predicting unit.

6. The turbine analysis device according to claim 1, further comprising a load input unit configured to receive an input of a load at which the turbine is to operate,
wherein the load and time calculating unit is configured to calculate the operable time of the turbine according to the input of the load.

7. A turbine analysis method comprising:
acquiring a state quantity of a turbine, the state quantity including at least a temperature of the turbine;
calculating a first Larson-Miller Parameter (LMP) value indicating a history of a load of the turbine, based on the state quantity;
calculating a consumed service life based on the first LMP value which has been calculated;
calculating a remaining service life of the turbine by subtracting the consumed service life from a designed service life of the turbine; and
deriving a relationship between the load of the turbine and an operable time in a case where the turbine operates at the load, based on a second LMP value calculated from the remaining service life and a rated temperature.

8. A non-transitory computer-readable computer medium storing a program that causes a computer to function as:
a state quantity acquiring unit configured to acquire a state quantity of a turbine, the state quantity including at least a temperature of the turbine;
a load specifying unit configured to calculate a first Larson-Miller Parameter (LMP) value indicating a history of a load of the turbine, based on the state quantity;
a remaining service life calculating unit configured to calculate a consumed service life based on the first LMP value calculated by the load specifying unit and the temperature of the turbine, and calculate a remaining service life of the turbine by subtracting the consumed service life from a designed service life of the turbine; and
a load and time calculating unit configured to derive a relationship between the load of the turbine and an operable time in a case where the turbine operates at the load, based on a second LMP value calculated from the remaining service life and a rated temperature.

9. The turbine analysis device according to claim 6, wherein the load and time calculating unit is configured to output a presentation screen which indicates the operable time of the turbine according to the input of the load, and display an increased portion regarding the operable time of the turbine according to the input of the load that has increased from the operable time of the turbine at the load of 100% using a format different from a format of the operable time of the turbine at the load of 100% on the presentation screen.

* * * * *